March 3, 1936. C. E. CARPENTER 2,032,468
DOUGHNUT MACHINE AND THE LIKE
Original Filed Oct. 17, 1931 4 Sheets-Sheet 1
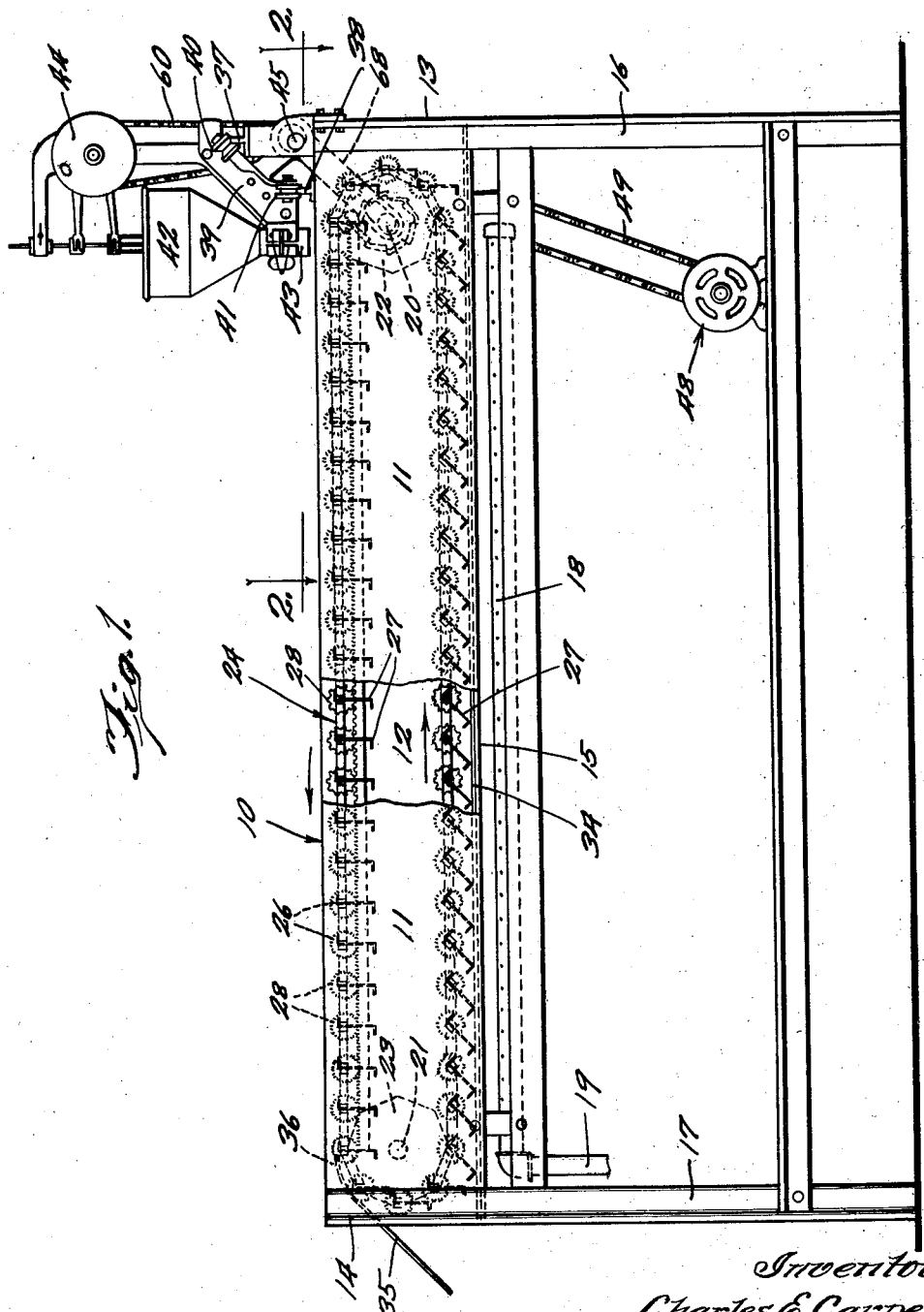
Inventor:
Charles E. Carpenter

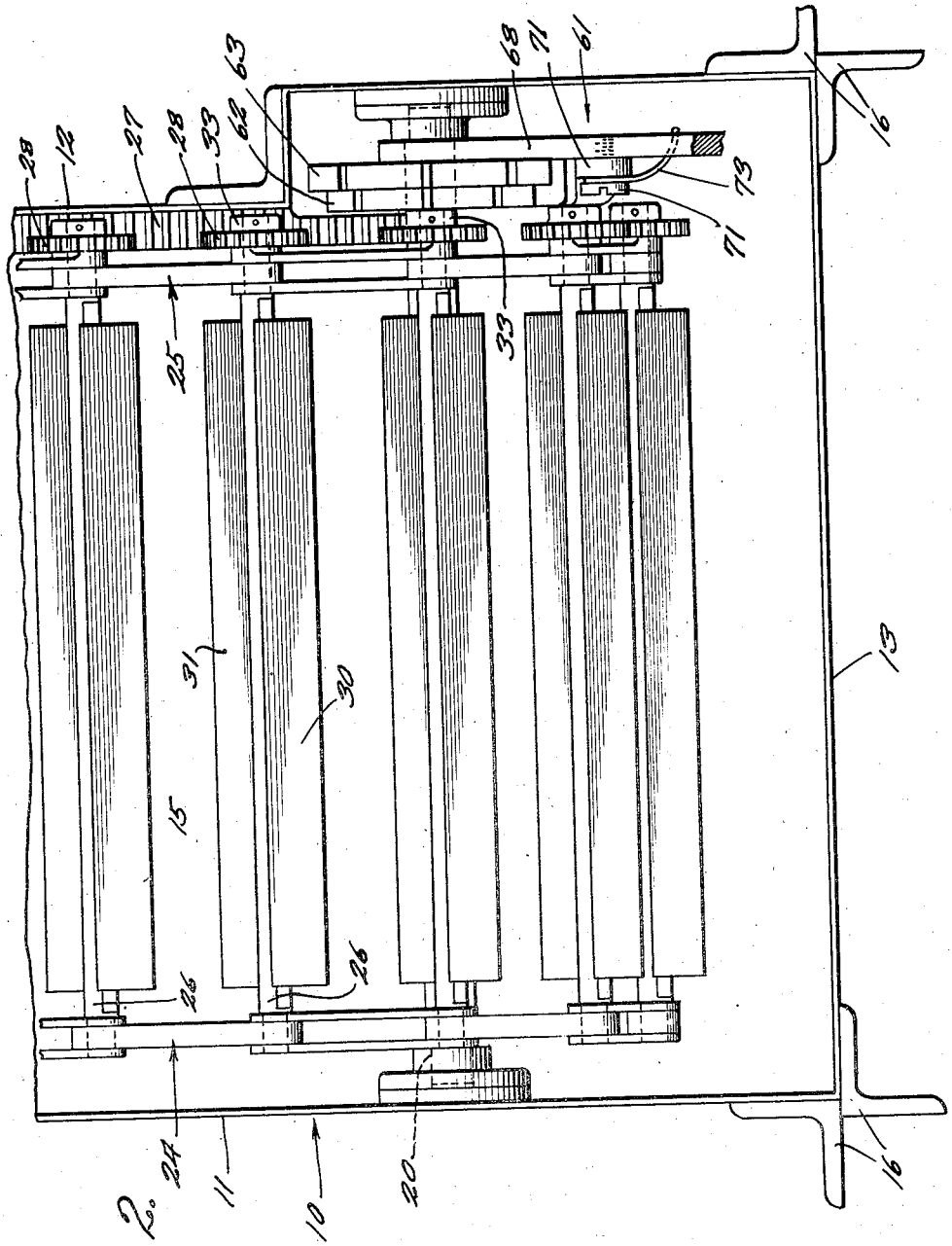

March 3, 1936.  C. E. CARPENTER  2,032,468
DOUGHNUT MACHINE AND THE LIKE
Original Filed Oct. 17, 1931   4 Sheets-Sheet 3
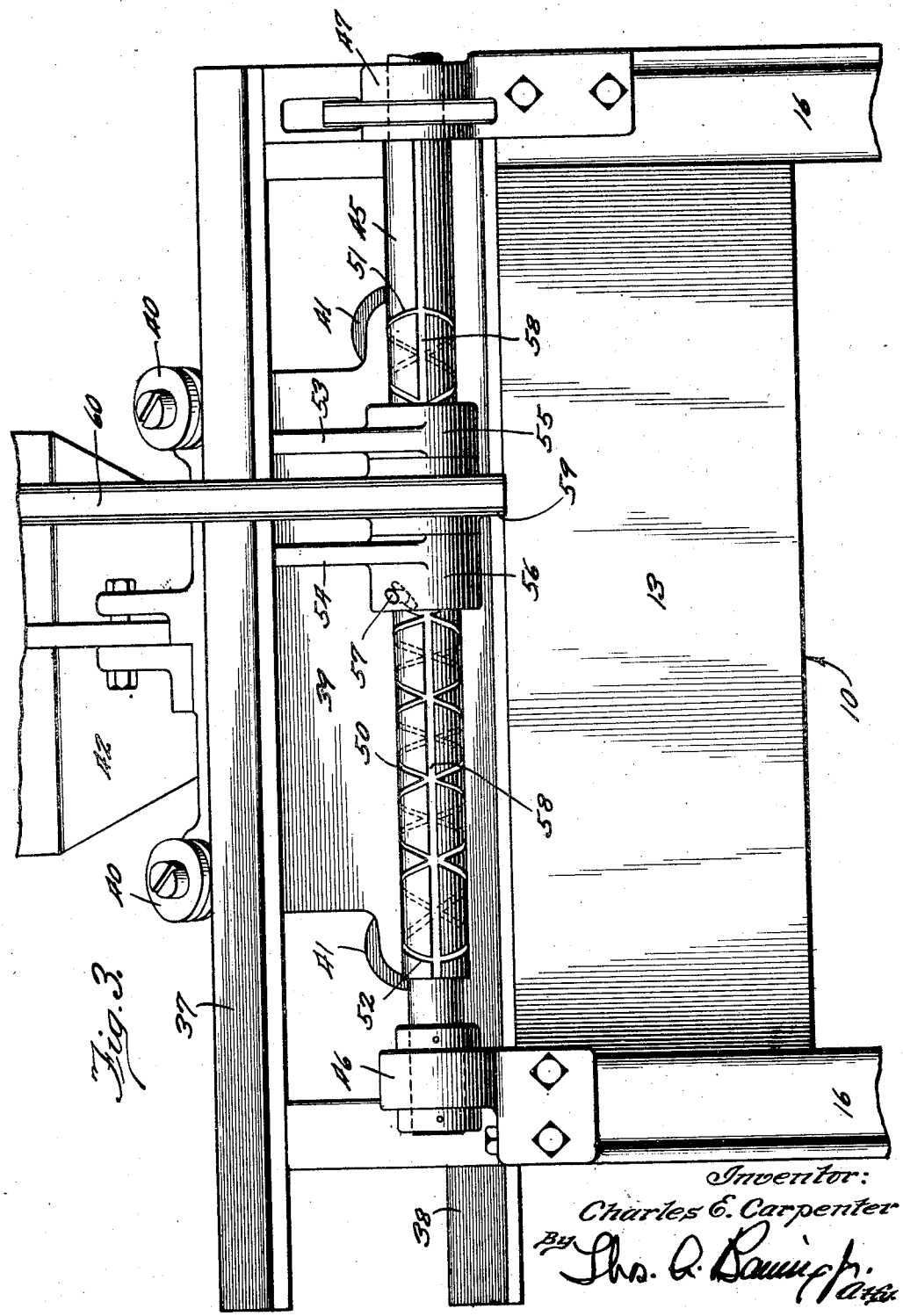

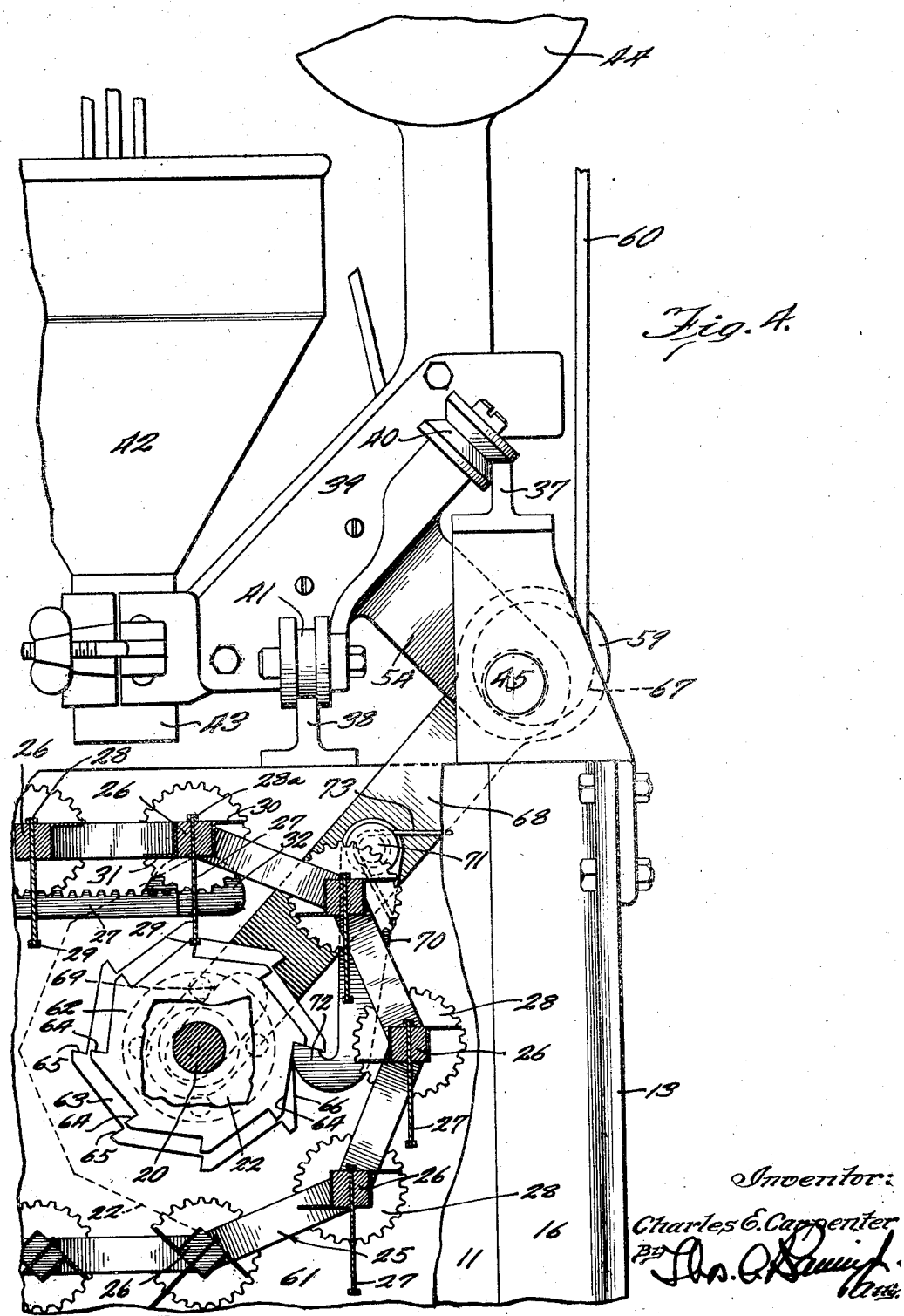

Patented Mar. 3, 1936

2,032,468

UNITED STATES PATENT OFFICE 2,032,468

DOUGHNUT MACHINE AND THE LIKE

Charles E. Carpenter, Chicago, Ill.

Application October 17, 1931, Serial No. 569,375
Renewed June 22, 1935

9 Claims. (Cl. 107—4)

This invention has to do with improvements in doughnut machines and the like. The features herein disclosed relate particularly to improvements in machines for producing the doughnuts in relatively large quantities, such machines being classed as commercial machines. Nevertheless certain of the features may be advantageously used in connection with machines intended for small rates of production and therefore I do not intend to limit myself to their use in machines of any particular size. It may be stated, however, that the machine herein illustrated and described is intended for a large production, as for example several hundred doughnuts per hour.

The machine herein described is of that type in which provision is made for simultaneously frying a number of doughnuts placed in rows across the pan, the designated rows of doughnuts being advanced lengthwise of the pan during the frying operation. Provision is made for automatically forming the individual doughnuts and dropping them in position in rows during the turning operations so that the turn-over mechanism is also properly designated and considered as a conveying mechanism.

Another feature of the invention relates to the provision of a new and improved means for discharging and delivering the completed doughnuts from the frying pan. This arrangement is such that the individual turn-over devices themselves serve to lift and deliver the completed doughnuts from the frying pan at the end of the operation.

Another feature of the invention relates to the provision of a new and improved means for automatically and periodically advancing the turning and conveying mechanism step by step in proper harmony with the movements of the doughnut forming mechanism. The arrangement is such that the turning and conveying mechanism is automatically advanced the distance necessary to present a new pocket at the completion of each travelling movement of the doughnut forming and dropping mechanism.

In connection with the foregoing it is an object of the invention to provide a very simple and effective device which is operated in timing with the rotations of the shaft already referred to so that said device performs an effective movement once at the completion of each proper number of shaft rotations.

A further feature relates to an improved form of paddle or shelf constructed in the turn-over mechanism. In this connection it is an object to provide a paddle or shelf which normally hangs in a lowered vertical position and which serves during a one half revolution of the device to swing into the horizontal position, and lift up the doughnut into the vertical position, so that it will turn over endwards, and then drop down into the lowered vertical position preparatory to another turning operation. This type of arrangement makes it possible to considerably reduce the vertical dimension or depth of the frying pan.

Other objects and uses of the invention will appear from a detailed description of the same which consists in the features of construction and the combinations of parts hereinafter described and claimed.

In the drawings:

Figure 1 shows a side elevation of a machine embodying the features of the present invention, a portion of the side plate at the near side of the pan being broken away;

Figure 2 shows a fragmentary horizontal section on the line 2—2 of Figure 1 looking in the direction of the arrows and on an enlarged scale;

Figure 3 shows a fragmentary end elevation looking toward the right or drive end of the machine, the legs and a portion of the doughnut hopper being broken away and the figure being on substantially the same scale as Figure 2; and Figure 4 shows a fragmentary side elevation of the end portion of the machine at the driving end, a portion of the sprocket shaft being broken away so as to better illustrate the operating mechanism, Figure 4 being substantially on the same scale as Figures 2 and 3.

In the drawings the frying pan is designated in its entirety by the number 10. It includes the side walls 11 and 12, the end walls 13 and 14, and the floor 15. The pan itself is supported in any convenient manner as by means of the legs 16 and 17 at the two ends of the device.

Preferably a burner 18 is located under substantially the entire length of the pan, said burner being supplied with fuel by means of the connection 19.

The cross shafts 20 and 21 extend across the end portions of the interior of the pan, said shafts carrying the sprockets 22 and 23 respectively. At one side of the frying pan there is a conveyor chain 24 which extends over the corresponding end sprockets 22 and 23; and to the other side there is another conveyor 25 which extends across the corresponding end sprockets 22 and 23. These two chains travel in perfect harmony due to the simultaneous driving of the end sprockets 22 on the shaft 20 as will be presently explained.

The chains 24 and 25 are made up of links which are pivoted together and the two chains are connected together by means of the rods or pins 26. The links are of such length that the distance between the pins is equal to the desired width of the pockets within which the frying doughnuts are accommodated.

At one side of the machine and just inside of the side wall 12 of the frying pan there is located a horizontally extending rack 27 which extends almost the full length of the pan. Each of the rods or pins 26 is provided on its end with a pinion 28 which meshes with the rack bar 27 so that as the conveyor advances toward the delivery end of the pan the rods or pins 26 are correspondingly rotated as well as advancing bodily.

Each of the rods or pins 26 is preferably rectangular as is best shown in Figure 4 and is provided with a longitudinally extending slot. These slots or pins terminate short of the ends of the rods or pins 26; and a conveyor and turning paddle 27 is located in each of the said slots as shown particularly in Figure 4. Preferably the edges of these plates 27 are enlarged as shown at 28 and 29 in Figure 4 thus preventing the plates or paddle from dropping clear through and out of the slots. The result is that each time the rod or pin 26 is rotated a one-half revolution plate 27 is swung up into the horizontal position where it then picks up a row of doughnuts, and then moves up into the vertical position, turning the picked up doughnuts during such operation; and at the same time due to the bodily advance of the rod or pin 26 toward the delivery end of the machine the so picked up and turned doughnuts are thrown endwardly and will drop down into the next endward pocket of the conveyer in upside-down or turned-over condition. Substantially as the vertical position of the plate 27 is reached it will slip or drop down again into the lowered vertical position as shown in Figure 4 but in a location where it has been advanced the distance of one pocket toward the delivery end of the machine.

Preferably the rods or pins 26 are provided with outwardly extending shelves 30 and 31 which extend at right angles to the plates 27. These shelves are of only sufficient dimension to prevent the turning over doughnuts from slipping down into the grease bath without turning over, and in some cases it will be found that the rods or pins 26 are themselves of sufficient dimension to accomplish this result without the necessity of providing the shelves 30 and 31.

At the beginning end of the rack bar 27 there is placed a cam shaped block 32; and on the end portion of each of the rods or pins 26 there is placed a square block 33 beyond the position of the corresponding pinion 28. As the conveyor chains advance the blocks 33 ride up over the cam block 32 in such manner as to bring the teeth of the pinions 28 into mesh with the rack bar teeth so as to commence the meshing operation in the proper manner and so as to ensure a proper turning of the paddle during the ensuing lengthward travel toward the delivery end.

It will be understood that the rack bar terminates in the delivery end of the device so that as the rods or pins deliver over the sprocket 23 and return along the bottom portion of the frying pan the paddle or plates 27 are free to occupy such positions as they conveniently assume. For example in Figure 1 the bottom 15 of the pan is provided with a longitudinally extending bar or rail 34 along which the descending paddle drags during the return travel in the direction of the arrow in Figure 1, thus making it possible to accommodate the paddles on the return side of the conveyor in a pan of shallower dimension than would otherwise be possible since the paddles do not need to hang straight down.

In the delivery end of the machine there is provided a wharf or plate 35 which slants downwardly over the end of the pan. The upper end of this wharf 36 occupies a position close to the point where the pinion 28 runs off of the rack bar, so that during the last turning movement the row of doughnuts is flopped over onto the wharf and the doughnuts will then slide down the wharf and be delivered. It will be understood that the level of the liquid grease should be at approximately the position of the rods or shafts 26.

At the other end of the machine there is provided a pair of crossward extending rails 37 and 38. A carriage 39 is provided with rollers 40 and 41 which travel on these rails. Said carriage carries and supports the doughnut hopper 42 which in turn is provided at its lower end with the delivery throat 43 through which the freshly formed and cut doughnuts are delivered into the liquid grease at the beginning pocket. This doughnut forming mechanism includes suitable operating devices which are driven by means of a sprocket 44. The details of construction of the doughnut forming and cutting mechanism do not require illustration herein as many forms of such devices are in well known and extensive use at this time.

There is a travelling shaft 45 which extends across the end of the machine adjacent to the path traversed by the carriage 39, said shaft 45 being journaled in suitable brackets 46 and 47. Said shaft 45 is also driven in any convenient manner continuously in the same direction as by means of an electric motor 48 through the medium of a chain 49 and suitable sprockets.

The shaft 45 is provided with a thread 50 which spirals lengthwise of the shaft first in one direction of twist and then returns lengthwise of the shaft in the other direction of twist, the end portions of the two directions of twist being connected together as shown at 51 and 52 in Figure 3. The carriage 39 is provided with a pair of outwardly projecting brackets 53 and 54 having the collars 55 and 56 which receive and travel on the shaft 45. One of these collars, namely 56, is provided with a pin or stud 57, which extends inwardly and travels in the slot 50; or carries a block which travels in said slot. As a consequence, the continued rotation of the shaft 45 in a given direction serves to shift the carriage 39 back and forth through a limit of travel dependent upon the limits 51 and 52 of the slot 50.

The shaft 45 is also provided with a longitudinally extending keyway 58, and a sprocket 59 is located on the shaft between the collars 55 and 56 and is splined to this keyway. The result is that said sprocket rotates with the shaft and shifts back and forth with the traversing of the carriage.

A chain 60 connects the sprocket 59 to the sprocket 44 so that the doughnut cutting and dropping mechanism operates continuously as the carriage traverses back and forth.

At the driving end the pan 10 is enlarged laterally to provide a chamber 61. A pair of ratchets 62 and 63 is located on the shaft 20 beyond the position of the sprocket 22. These ratchets 62 and 63 are provided with companion notches 64 and 65 respectively, the notches of each pair 64 and 65 being in radial alignment. Furthermore all of the notches 65 are located in greater radial dimension than the companion notches 64, with the exception of the single notch 66 which reaches inwardly far enough to completely overlap the corresponding notch 64.

There is an eccentric 67 on the shaft 45, and a link 68 has one end working on said eccentric and reciprocated thereby. The other end of said link 68 is slotted as shown at 69 and slides back and forth on the shaft 20. A dog 70 is pinned to the link 68 by the link 71, said dog being provided with the hook 72 which overlaps both of the ratchets 62 and 63 and is able to engage the teeth of both of them. A spring 73 tends to throw the dog out into the position shown in Figure 4 so as to keep its hook engaged with the ratchets.

With this arrangement each rotation of the shaft 45 causes the hook 72 to advance the ratchet 63 one notch in the counterclockwise direction when viewed as in Figure 4, thus rotating the ratchet 63 which is loose upon the shaft 20. During each such advancing movement the hook 72 is held out far enough to prevent it from engaging the corresponding tooth of the ratchet 62 which is secured to the shaft 20 until finally the deep tooth 66 of the ratchet 63 comes around into the position shown in Figure 4 where it is engaged by the hook. This particular tooth is deep enough to permit the hook 72 to also engage a tooth of the ratchet 62 so that said ratchet is also notched over thereby advancing the shaft 20 one position.

With the above arrangement it is evident that the advancements of the shaft 20 are intermittent and take place only after the performance of a number of revolutions of the shaft 45 equal to the number of shallow teeth in the ratchet 63.

The ratchet 62 is so proportioned that when it is notched over one notch it causes the conveyor to advance the distance between one pair of rods or pins 26—that is the distance of one doughnut pocket. Furthermore the number of revolutions of the shaft 45 necessary to be performed between two consecutive advancing operations of the conveyor is the same as the total number of said shaft revolutions necessary to cause the carriage 39 to perform one complete traversing movement. Thus in the construction actually illustrated the shaft 45 performs eight revolutions for one traversing movement of the carriage, these eight revolutions corresponding to eight movements of the link 68 and eight teeth of the ratchet 63. Furthermore the ratio of the sprocket 59 to the sprocket 44 is two to one so that the doughnut forming device operates four times during one traversing of the carriage. The result is that four doughnuts are dropped in each row, then the conveyor is advanced while the carriage overruns and starts back on the next or return traverse. Four doughnuts are then dropped in that row, then the carriage overruns and starts back on a new traverse in the original direction, the conveyor having been advanced during each overturning.

It will be seen that the entire operation of the machine is performed and controlled in an extremely simple manner by the operations of a simple shaft 45.

While I have herein shown and described only a single embodiment of the features of my present invention, still I do not intend to limit myself thereto except as I may do so in the claims.

I claim:

1. In a device of the class described, the combination of a frying pan, a carriage mounted for traversing movement above the same, a doughnut former carried by said carriage, means for actuating the same to deliver dough batches at equal distances of travel in each direction of traversing movement of the carriage, a transversely extending shaft, a thread extending in spiral fashion in the same direction of rotation around the shaft along the shaft in one direction between two limits on the shaft and then returning along the shaft in the other direction to the original limit, means for driving the shaft continuously in the same direction of rotation, and a driving connection between said thread and the carriage, whereby when the shaft is continuously driven in the same direction, the carriage is traversed alternately back and forth across the pan, substantially as described.

2. In a device of the class described, the combination of a frying pan, a carriage mounted for traversing movement above the same, a doughnut former carried by said carriage, means for actuating the same to deliver dough batches at equal distances of travel in each direction of traversing movement of the carriage, a transversely extending shaft, said shaft being provided with overlapping threads spiralling around the shaft in opposite directions between two limit positions on the shaft, the threads being interconnected at the limit positions aforesaid, a driving member connected to the carriage and engaging said threads, and means for driving the shaft continuously in the same direction of rotation, whereby the carriage is alternately traversed back and forth in opposite directions with continuous rotation of the shaft, substantially as described.

3. In a device of the class described, the combination of a frying pan, a carriage mounted for traversing movement above the same, a doughnut former carried by said carriage, means for actuating the same to deliver dough batches at equal distances of travel in each direction of traversing movement of the carriage, and means for causing said carriage to traverse back and forth alternately in opposite directions comprising a single shaft having a continuous thread in its surface spiralling along the shaft from one limit position to another limit position and then returning along the shaft to the first mentioned limit position with rotation of the shaft continuously in the same direction, and means for traversing the carriage by the use of said thread substantially as described.

4. In a device of the class described, the combination of a frying pan, a carriage mounted for traversing movement above the same, a doughnut former carried by said carriage, means for actuating the same to deliver dough batches at equal distances of travel in each direction of traversing movement of the carriage, and means for traversing said carriage back and forth comprising a continuously rotating uni-directional shaft, means for continuously driving said shaft in said direction, and a forwardly and reversely spiralled thread on said shaft, and means connected to the carriage engaging said thread, substantially as described.

5. In a device of the class described, the combination of a frying pan, a carriage mounted for traversing movement above the same, a doughnut former carried by said carriage, means for actuating the same to deliver dough batches at equal distances of travel in each direction of traversing movement of the carriage, and means for alternately driving the carriage back and forth, comprising a continuously rotating uni-directional shaft having its surface provided with threads spiralling between limits of movement in opposite directions when said shaft continuously rotates in said uni-direction and means connected to the carriage for engaging said oppositely spiralling threads alternately, substantially as described.

6. In a device of the class described, the combination of a frying pan, a carriage mounted for traversing movement above the same, doughnut forming and delivering mechanism carried by said carriage, a series of laterally movable conveying devices in the pan, means for advancing the same intermittently in a delivery direction, and means for continuously operating the doughnut forming and delivering mechanism to thereby form and deliver an equal number of doughnuts during each of its traversing movements, substantially as described.

7. In a device of the class described, the combination of a frying pan, a conveyor located therein and having a series of compartments extending transversely of the pan, a carriage mounted for traversing movement above the pan, doughnut forming and delivering mechanism carried by said carriage, means for driving said mechanism continuously in a given direction, means for intermittently advancing the conveying mechanism, and means for insuring delivery of an equal number of doughnuts into the frying pan for each traversing movement of the carriage, substantially as described.

8. In a device of the class described, the combination of a frying pan, a carriage mounted for transverse movement above the same, doughnut forming and delivering mechanism carried by said carriage, a series of laterally movable conveying devices in the pan, means for advancing the same in a delivery direction, and means for continuously operating the doughnut forming and delivering mechanism to thereby form and deliver an equal number of doughnuts during each of its traversing movements, substantially as described.

9. In a device of the class described, the combination of a frying pan, a conveyor located therein and having a series of compartments extending transversely of the pan, a carriage mounted for traversing movement above the pan, doughnut forming and delivering mechanism carried by said carriage, means for driving said mechanism continuously in a given direction, means for advancing the conveying mechanism, and means for ensuring delivery of an equal number of doughnuts into the frying pan for each traversing movement of the carriage, substantially as described.

CHARLES E. CARPENTER.